W. G. PRICE.
FRUIT BOX PRESS.
APPLICATION FILED NOV. 10, 1919.

1,388,201.

Patented Aug. 23, 1921.
2 SHEETS—SHEET 1.

INVENTOR

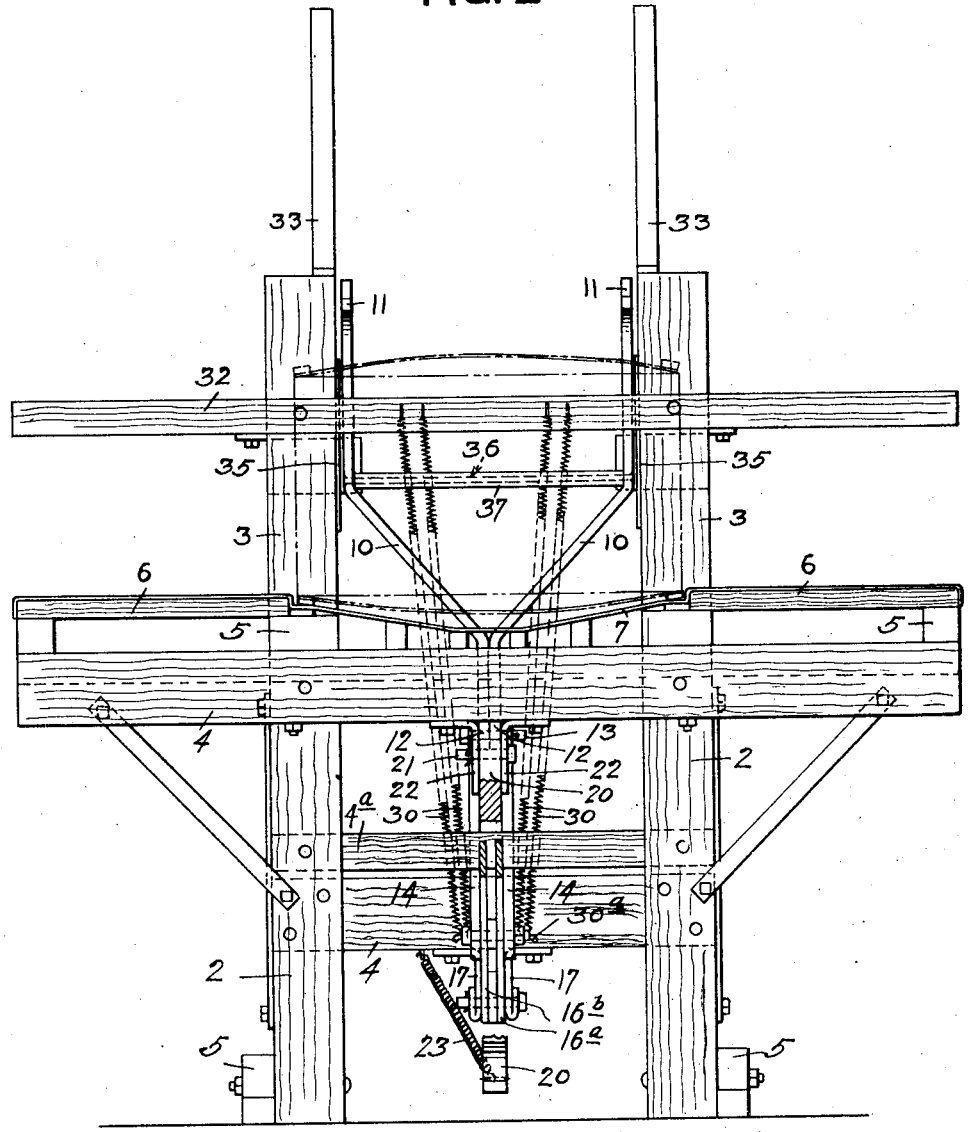

UNITED STATES PATENT OFFICE.

WILLIAM G. PRICE, OF YAKIMA, WASHINGTON.

FRUIT-BOX PRESS.

1,388,201. Specification of Letters Patent. Patented Aug. 23, 1921.

Application filed November 10, 1919. Serial No. 336,825.

*To all whom it may concern:*

Be it known that I, WILLIAM G. PRICE, a citizen of the United States and resident of Yakima, in the county of Yakima and State of Washington, have invented a new and useful Improvement in Fruit-Box Presses; and I do hereby declare the following to be a full, clear, and exact description thereof.

My invention relates to apparatus for pressing fruit into boxes, and for holding down the covers of fruit boxes during nailing.

One object of my invention is to improve the construction of fruit box presses by so shaping and locating the press arms that they will offer the least possible interference with the operator's hand, hammer and material, while placing the cover and cleats, stamping the box and nailing the cover.

Another object of my invention is to provide a fruit box press in which the actuating pressure is applied to the press arms in a substantially vertical line beneath the box and midway between its sides, with the result that the frictional resistance of the machine parts is reduced to a minimum.

Figure 3:
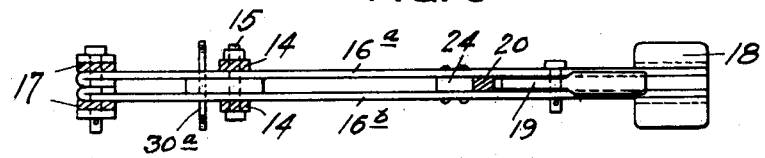
Figure 1:
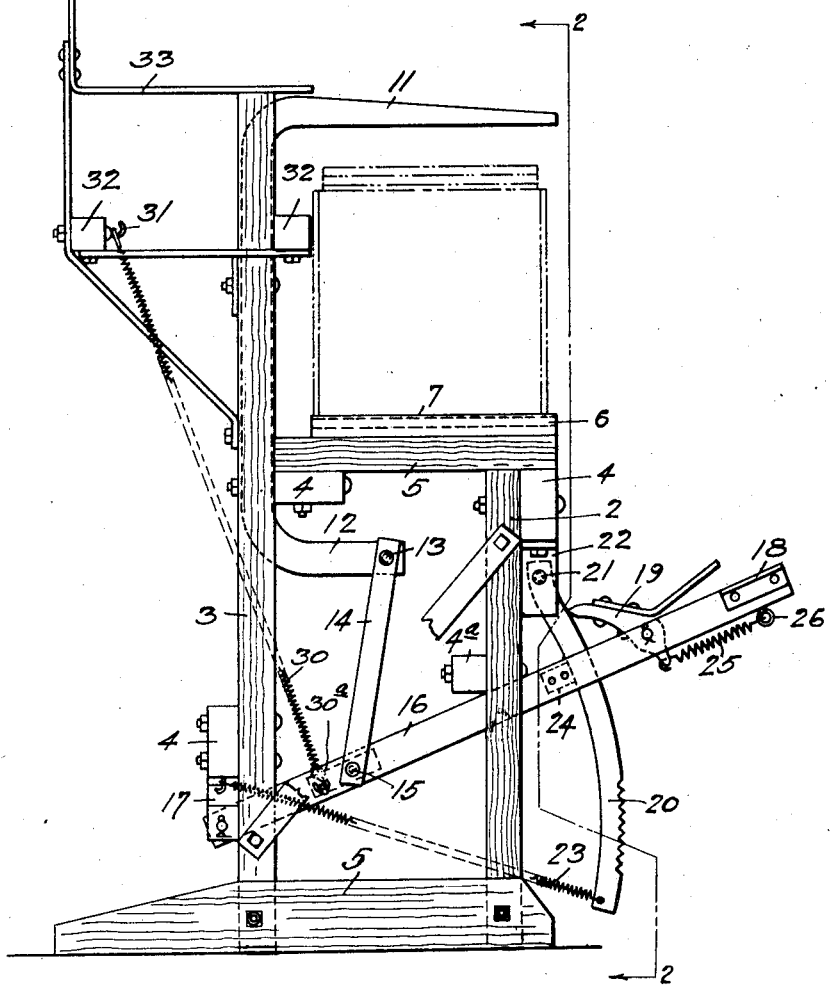

To these ends, and with a view to other improvements, which will hereinafter appear, my invention consists in the construction and arrangement of parts, a preferred embodiment of which is illustrated in the accompanying drawings, in which Figure 1 is an end elevational view of a box press with part of the operating treadle mechanism omitted; Fig. 2 is a side elevational view of the same press partly in section on the line 2—2, Fig. 1; and Fig. 3 is a plan view of the lever which operates the press.

Referring to the drawings, the box press therein shown comprises a supporting frame having front uprights 2, rear uprights 3, transverse horizontal braces, 4 and 4ª and other horizontal braces 5 which unite the uprights 2 and 3. The horizontal members 4 support box receiving tables 6 between which is a downwardly curved table composed of slats 7.

Disposed between the uprights 3 at the rear of the press is a vertically movable set of press arms, the particular construction of which forms a material part of my invention. Each of the press arms consists of a U-shaped bar 10 having one horizontal arm 11 extending over and above the box receiving table 7, and having a lower horizontal arm 12 extending beneath the table 7. The arms 12 converge, as shown in Fig. 2, and are attached together by means of a pin 13, which also serves to attach to the joined arms 12 a pair of links 14 which are pivotally attached at their lower ends by means of a pin 15 to an operating treadle 16.

The treadle 16 is pivotally attached at its rear end between brackets 17 carried by the transverse brace 4 of the frame. At the forward end of the treadle 16 is a foot plate 18 and a pawl 19 which coöperates with a swinging ratchet 20 pivotally mounted at its upper end upon a pin 21 secured between brackets 22 that are attached beneath the forward transverse brace 4 of the frame. To the lower end of the ratchet 20 is attached a tension spring 23 which in turn is attached to the lower rear brace 4 of the frame, and tends to pull the ratchet 20 to the rear. This movement is resisted by a block 24 carried by the treadle 16 and bearing against the rear edge of the ratchet 20. A short spring 25 is attached between the pawl 19 and a ring 26 on the treadle and serves to press the pawl toward the ratchet. The spring 23 serves to take up any lost motion that there may be between the ratchet and the treadle and also insures that the pawl, when depressed, shall detach itself quickly from the ratchet.

The treadle 16 is normally maintained in its upper position, as shown in Fig. 1, by means of a set of tension springs 30 which are secured at their lower ends to a rod 30ª on the treadle, and at their upper ends by means of hooks 31 to a transverse bar 32 which, with a second transverse bar 32, as shown in Fig. 1, serves as a support for the nail stripper and box cleats. Two spaced brackets 33 are supported by one of the bars 32 and by the rear uprights 3 and serve to carry a supply of box covers.

As shown in Fig. 3, the treadle 16 consists of two parallel bars 16ª and 16ᵇ between which is disposed the ratchet 20, together with the block 24. The lower ends of the connecting links 14 are connected to the outer sides of the bars 16ª and 16ᵇ.

It will be observed that the vertical portions of the U-shaped press members 10 are disposed near the uprights 3, but are not confined within fixed guides, as is usual in machines of this character. This permits the yoke formed by the two arms 10 to tilt sidewise, if necessary, in order to accommodate boxes having ends of unequal height. Bearing plates 35 are attached to the inner sides of the rear uprights 3 and serve as guides for the members 10. In order to unite the members 10 rigidly together, and at the same time to space them apart and resist pulling-together strains, I provide a compression spacer consisting of a rod 36 secured at its ends to the members 10 and surrounded by a section of pipe 37, as shown in Fig. 2.

In the operation of my fruit box press, a box filled with fruit is placed upon the receiving table 7 from either side of the press. The cover and slats are applied and the operator depresses the treadle 16, thereby bringing the press arms 11 down upon the box cover. It will be observed that the pull exerted by the treadle 16 upon the yoke formed by the U-shaped members 10 is applied in a vertical direction, and that the line of pull is disposed beneath the box which is being pressed, and substantially midway between its sides. This arrangement results in easy operation, since friction is thereby reduced to a minimum. The treadle is maintained in its lower position by the engagement of the pawl 19 with the teeth of the ratchet 20, the ratchet being prevented from swinging back by means of the block 24. When the cover and slats are nailed on, the operator releases the pawl 19 and the treadle rises to its original position, as shown, the spring 25 being made sufficiently weak to prevent it from reëngaging the pawl with the ratchet before the treadle reaches its upper position.

The parts are then in the positions shown in the drawings, the fruit box being in the position in dotted lines, ready to be removed.

The spring 25 may be omitted from the pawl 19, in which case the pawl 19 is so proportioned as to be nearly balanced on its pivot with its ratchet-engaging end a trifle heavier than the other end. This construction enables the operator to disengage the pawl by striking it with his foot, and then to immediately release the pawl, since by reason of the slow oscillation of the pawl it will not again touch the ratchet bar until the lever has risen to its upper position.

It will be evident that numerous modifications in the construction and arrangement of parts may be made in the box press which I have shown and described, and it is to be understood that my invention comprises all such modifications as fall within the scope of the appended claims.

What I claim is:

1. In a fruit box press, the combination of a frame, press arms vertically slidable therein, a box-receiving support, an operating lever, and a link pivotally connected to the said lever and to the said arms whereby the pull of the said lever is transmitted to the said arms at a point beneath the said box-receiving support and substantially midway between the sides and ends of the box.

2. In a fruit box press, the combination of a box-receiving support, a pair of U-shaped press members, each of which has one arm extending above the said support and its other arm extending beneath the said support, means for vertically reciprocating the said members, and compression-resisting means attached to said U-shaped members for spacing apart the upper portions of the said members.

3. In a fruit box press, the combination of a box-receiving support, a pair of U-shaped press members, each of which has an upper arm extending above the said support and a lower arm extending beneath the said support, the said lower arms being secured together centrally beneath the said support, compression-resisting means secured to the said U-shaped members for spacing apart the said upper arms of the said members, and an operating lever connected to the joined lower arms of the said members.

4. In a fruit box press, the combination of a frame, a box-receiving support, a pair of U-shaped press members vertically movable in the said frame, each of the said press members having an upper arm extending above the said support and a lower arm extending beneath the said support, both of the said members being bent to bring the said lower arms together centrally beneath the said support, compression-resisting means secured to and spreading apart the upper portions of the said press members, an operating treadle pivotally mounted in the said frame, and a substantially vertical link connecting the said treadle to the joined lower ends of the said press members.

5. In a fruit box press, the combination of a frame, press members vertically movable therein, a pivotally mounted lever for moving the said press members and means for controlling the movement of the said lever comprising a bracket, a ratchet depending therefrom, a spring attached to the lower end of the said ratchet and to the said frame, a stop member carried by the said lever adjacent to the said ratchet, and a pawl carried by the said lever and adapted to engage the said ratchet.

6. In a fruit box press, the combination of a frame, press members vertically movable therein, an operating lever pivotally mounted on the said frame, the said lever being composed of two parallel spaced members, and means for controlling the movement of the said lever comprising a bracket, a ratchet depending therefrom and extending between the parallel members composing the said lever, a spring attached to the lower end of the said ratchet and to the said frame, a stop member carried by the said lever adjacent to the said ratchet, and a pawl carried by the said lever and adapted to engage the said ratchet.

7. In a fruit box press, the combination of a frame, a box-receiving support, and a yoke vertically movable in the said frame and rigidly carrying pressure arms extending over the said box-receiving support, the said yoke and the said arms being adapted to tilt laterally as a unit to bring both of the said arms into engagement with boxes that are of different heights at their two ends.

In testimony whereof I, the said WILLIAM G. PRICE, have hereunto set my hand.

WILLIAM G. PRICE.

Witnesses:
 E. B. VELIKANJE,
 MILAN VELIKANJE.